(12) United States Patent
Wu et al.

(10) Patent No.: US 11,059,943 B2
(45) Date of Patent: Jul. 13, 2021

(54) CONDUCTIVE CELLULOSE NANOCRYSTALS, METHOD OF PRODUCING SAME AND USES THEREOF

(71) Applicant: Celluforce Inc., Montreal (CA)

(72) Inventors: Xiuyun Wu, Kitchener (CA); Kam Chiu Tam, Waterloo (CA); Richard Berry, Notre-Dame-de-l'Ile Perrot (CA); Aiping Yu, Waterloo (CA)

(73) Assignee: CELLUFORCE INC., Montreal (CA)

( * ) Notice: Subject to any disclaimer, the term of this patent is extended or adjusted under 35 U.S.C. 154(b) by 0 days.

(21) Appl. No.: 16/192,577

(22) Filed: Nov. 15, 2018

(65) Prior Publication Data
US 2019/0194400 A1 Jun. 27, 2019

Related U.S. Application Data

(63) Continuation of application No. 14/887,415, filed on Oct. 20, 2015, now abandoned.

(60) Provisional application No. 62/065,954, filed on Oct. 20, 2014.

(51) Int. Cl.
| | | |
|---|---|---|
| *C08J 3/12* | (2006.01) | |
| *H01B 1/12* | (2006.01) | |
| *H01G 11/48* | (2013.01) | |
| *B01J 13/18* | (2006.01) | |
| *B01J 13/22* | (2006.01) | |

(52) U.S. Cl.
CPC ............ *C08J 3/126* (2013.01); *B01J 13/18* (2013.01); *B01J 13/22* (2013.01); *H01B 1/127* (2013.01); *H01G 11/48* (2013.01); *C08J 2301/04* (2013.01); *C08J 2439/06* (2013.01); *C08J 2465/00* (2013.01); *Y02E 60/13* (2013.01); *Y02T 10/70* (2013.01)

(58) Field of Classification Search
None
See application file for complete search history.

(56) References Cited

U.S. PATENT DOCUMENTS

| 2004/0198903 A1* | 10/2004 | Madle | C08F 285/00 524/800 |
|---|---|---|---|
| 2010/0041034 A1* | 2/2010 | Murante | C07H 21/00 435/5 |

(Continued)

FOREIGN PATENT DOCUMENTS

| WO | WO 2011/140658 A1 | 11/2011 | |
|---|---|---|---|
| WO | WO-2011140658 A1 * | 11/2011 | ................ C08J 5/18 |
| WO | WO 2014/201562 A1 | 12/2014 | |

OTHER PUBLICATIONS

An, K.H., et al., Electrochemical Properties of High-Power Supercapacitors Using Single-Walled Carbon Nanotube Electrodes, Advanced Functional Materials, vol. 11, Issue 5, Oct. 2, 2001, pp. 387-392.
(Continued)

*Primary Examiner* — Shamim Ahmed
*Assistant Examiner* — Bradford M Gates
(74) *Attorney, Agent, or Firm* — Bryan D. Zerhusen; Cantor Colburn LLP

(57) ABSTRACT

The present disclosure provides a core-shell nanocomposite material comprising an intrinsically conductive polymer (ICP) and surface-modified cellulose nanocrystals (CNCs) as well as synthesis for preparing same and its use thereof in various applications.

5 Claims, 9 Drawing Sheets

(56) References Cited

U.S. PATENT DOCUMENTS

| | | | |
|---|---|---|---|
| 2010/0266896 | A1 | 10/2010 | Stromme et al. |
| 2011/0008427 | A1* | 1/2011 | Biggs .................. A61K 8/11 424/463 |
| 2011/0048772 | A1* | 3/2011 | Han .................... C09D 11/52 174/257 |
| 2011/0101318 | A1 | 5/2011 | Meyer-Friedrichsen et al. |
| 2011/0236498 | A1* | 9/2011 | Marteaux ............. B01J 13/18 424/497 |
| 2012/0050384 | A1 | 3/2012 | Nishiguchi et al. |
| 2014/0342229 | A1 | 11/2014 | Kwak et al. |

OTHER PUBLICATIONS

Frackowiak, E., Nanotubular materials for supercapacitors, Journal of Power Sources, vols. 97-98, Jul. 2001, pp. 822-825.

Han, Y., et al., Preparation of Graphene/polypyrrole Composites for Electrochemical Capacitors, Journal of New Materials for Electrochemical Systems, vol. 13, No. 4, Nov. 5, 2010, pp. 301-376.

Lange, U., et al., Conducting polymers in chemical sensors and arrays, vol. 614, Issue 1, Apr. 28, 2008, pp. 1-26.

Li, C., et al., Conducting polymer nanomaterials: electrosynthesis and applications, Chem. Soc. Rev., Apr. 3, 2009, 38, pp. 2397-2409.

Li, Y., et al., KOH modified graphene nanosheets for supercapacitor electrodes, Journal of Power Sources, vol. 196, Issue 14, Jul. 15, 2011, pp. 6003-6006.

Schultze, J.W., et al., Application potential of conducting polymers, vol. 50, Issues 7-8, Feb. 15, 2005, pp. 1739-1745.

Zhang, X., et al., Synthesis of Polyaniline Nanofibers by "Nanofiber Seeding", J. Am. Chem. Soc. 2004, 126, 14, pp. 4502-4503.

U.S. Appl. No. 14/887,415, filed Oct. 20, 2015, US 2016-0347916 A1.

* cited by examiner

CONDUCTIVE CELLULOSE NANOCRYSTALS, METHOD OF PRODUCING SAME AND USES THEREOF

FIELD OF THE DISCLOSURE

The present disclosure provides a core-shell nanocomposite material comprising an intrinsically conductive polymer (ICP) and surface-modified cellulose nanocrystals (CNCs) as well as synthesis for preparing same and its use thereof in various applications.

BACKGROUND OF THE DISCLOSURE

The demand for various consumer electronics and hybrid vehicles capable of delivering a high power supply in short pulses with an extremely long cycle life has prompted extensive interest in supercapacitors (SPs).

Intrinsically conductive polymers (ICP) have demonstrated their usefulness in a wide variety of applications, such as sensors, anti-static/electromagnetic interference shielding, organic light-emitting diode (OLED), supercapacitors, etc. due to their superior physical and chemical properties (Lange, U.; Roznyatovskaya, N. V.; Mirsky, V. M., *Analytica chimica acta* 2008, 614 (1), 1-26; Li, C.; Bai, Shi, G., *Chemical Society reviews* 2009, 38 (8), 2397-409). However, the inherent problems with ICPs such as low solubility, intractable phase, poor mechanical properties make them difficult to process into useful products (Schultze, S. W.; Karabulut, H., *Electrochimica Acta* 2005, 50 (7-8), 1739-1745).

One example of a typical ICP is polypyrrole (PPy) that has been intensively studied for decades as a promising electrode material for SPs due to its ease of synthesis, low cost, good conductivity, stability and excellent specific capacitance (Cs). However, being mechanically weak, PPy experiences significant structural breakdown resulting from volumetric swelling/shrinkage resulting in a fast capacitance decay over extended cycles (less than 50% retention of the initial capacitance after 1000 cycles). Another drawback is the poor processibility and unsatisfactory specific capacitance (Cs) (F/g) due to agglomeration resulting from strong intermolecular, intramolecular interactions and possible cross-linking of PPy chains.

Cellulose Nanocrystals (CNCs) extracted from wood fibers by acid hydrolysis are rod-like crystals. The attractive features are: (i) it is stronger than steel yet incredibly light, (ii) high aspect ratio and specific surface area, (iii) enriched surface active groups, (iv) biodegradability, (v) abundance etc. This makes CNC a promising structural nanomaterial (as reinforcing agents), or functional nanomaterials for the fabrication of other functional nanocomposites.

The Applicant has previously described in PCT/CA2014/050570 an in situ chemical polymerization, for preparing an ICP/CNC system with a core-shell structure that possessed attractive supercapacitor behavior.

The precise control of a uniform and thin ICP-coated (such as PPy-coated) nanocomposites at nanoscale remains a challenge since it is difficult to fully prevent the formation of free polymer particles in bulk solution, and deposited conjugated polymers on the nanoparticles are often irregular and thick. For example, PPy-based hybrid materials loose their fine fibril structure due to agglomerations.

SUMMARY OF THE DISCLOSURE

In one aspect, there is provided a composite having a core-shell arrangement, said composite comprising cellulose nanocrystal (CNC) as the core, a first layer comprising at least one surface agent in contact with said CNC and a second layer comprising at least one intrinsically conductive polymer (ICP) in contact with said surface agent In a further aspect, there is provided a process for preparing the composite having a core-shell arrangement as defined herein, said process comprising the steps of:
dispersing the cellulose nanocrystal (CNC) in a solution;
mixing the CNC solution and at least one surface agent to cause adsorption of said surface agent on the CNC surface and form said first layer;
adding at least one monomer of said intrinsically conductive polymer and polymerizing said monomer to form said second layer in contact with said first layer comprising the surface agent; and
isolating said composite.

A core-shell conductive polymer/cellulose nanocrystal composite prepared by the method as defined herein.

A composite material comprising the composite having a core-shell arrangement as defined herein.

A process for preparing a supercapacitor electrode comprising casting a slurry of the composite having a core-shell arrangement as defined herein on an electrode followed by drying of said slurry.

BRIEF DESCRIPTION OF THE DRAWINGS

Embodiments will now be described, with reference to the drawings, in which.

DETAILED DESCRIPTION OF THE DISCLOSURE

Figure 1:
FIG. 1 is a schematic representation of the experimental strategy to prepare the core-shell structure in accordance with one embodiment of this disclosure.

Additional details describing various embodiments of the present surface-modified cellulose nanocrystals (CNCs), comprising a surface agent, and an intrinsically conductive polymer is provided.

As used herein, the term "intrinsically conductive polymer" refers to organic polymer that conducts electricity. In one embodiment, the conductive polymer of said conductive polymer/cellulose nanocrystal composite is polypyrrole, polyaniline, polyindole, polythiophene, poly(3-methylthiophene, poly(N-methyl aniline), or poly(o-toluidine). Preferably, the conductive polymer is polypyrrole.

The CNCs herein are rod-like crystals with a mean diameter of 10-20 nm and lengths of 200-400 nm. It can practically be extracted from various sources like cotton, wood, alga etc. In this case, we used kraft-bleached pulp, which was obtained from Domtar and the CNC was produced by Celluforce Inc. (Montreal, Quebec Canada).

As described herein, the CNCs are coated with a surface agent before it is further coated with the ICP by polymerization of the corresponding monomer.

The composite having a core-shell arrangement, as described herein can be viewed as conductive nanocomposite rods (or rod-like) having dimensions as shown in the TEM images.

A method is described for synthesizing electrically conductive CNCs by coating them with a surface agent which is PVP and an ICP which is PPy. Usage of CNC as the substrate is believed to facilitate the linearly, well-ordered growth of conductive polymers due to the 'templating effect' (Xinyu Zhang, W. J. G., and Sanjeev K. Manohar, *Journal of the American Chemical Society* 2004, 126 (14), 4502-4503). It also resolves the intrinsic problem of poor mechanical strength and poor processability associated with these polymers.

As described herein, the present disclosure provides a controlled synthesis of individually coated cellulose nanocrystals (CNCs) as the core, a first layer of at least one surface agent in contact with said CNC and a second layer of at least one intrinsically conductive polymer in contact with said surface agent. The degree of surface modification of CNC can be controlled as described herein and allows to achieve the desired PVP coating and PPy polymerization. The examples herein demonstrate the synthetic steps and comprise a treatment of CNC with a surface agent and adding the ICP corresponding monomers in the mixture to allow polymerization.

There is therefore provided a process for preparing the composite having a core-shell arrangement as defined herein, said process comprising the steps of dispersing the cellulose nanocrystal (CNC) in a solution;

adding to the CNC, a solution of at least one surface agent, optionally in solution, to cause adsorption of said surface agent on the CNC surface and form said first layer (i.e. for PVP/CNC);

adding a polymerization catalyst, optionally in solution, to the PVP/CNC solution;

adding at least one monomer, optionally in solution, of said intrinsically conductive polymer and polymerizing said monomer to form said second layer in contact with said surface agent; and quenching said polymerization and isolating said composite.

In one embodiment, surface agents that can be used in this disclosure include without limitation Poly(4-vinylpyridine) (P4VP), poly(N,N-dimethyl acrylamide) (PDMA), poly(N, N-dimethyl acrylamide) (GTMAC), Polyethylenimine (PED, etc. Although other amphiphilic agents can be used, PVP is a most commonly used and cost effective surface agent.

By using a common surface agents, preferably PVP, it is believed that the agent will wrap around CNC to form the hydrophobic layer and promote the stronger interaction between CNC and the pyrrole monomers. It also act as a stabilizer due to steric hindrance to enhance the colloidal stability of the hybrid material and prevent further aggregation. It is also believed that the amphiphilic properties of PVP provide active sites on the CNC to induce the polycationic PPy growing towards homogeneous coating.

Herein, the mass ratio of PVP to CNC can be varied to achieve desirable colloidal stability and conductivity. In one embodiment, the surface agent can be mixed with the CNC at different surface agent/CNC mass ratio. For example, the surface agent/CNC can range from 5/100 to 100/100. Other embodiments include about 20/100, 40/100 or preferably about 10/100. In one embodiment, when the surface agent is PVP, said PVP and CNC can be mixed for about 24 hours to ensure appropriate adsorption of PVP on the CNC surface.

In one embodiment of the method, the monomer corresponding to the ICP, such as a pyrrole monomer, and said surface agent/CNC are mixed for a suitable time interval and controlled temperature, preferably for a time duration of about one hour. Preferably the temperature is from about 0 to 5 degrees.

In one embodiment of the method, said step of polymerization of said monomer is carried for a controlled time and temperature, preferably for about 16 hours, preferably at a temperature of from about 0 to 5 degrees.

Polypyrrole (Ppy) can be synthesized via the oxidation of pyrrole with an oxidant. The most commonly used oxidizing agents are oxidative transition metal ions. Although $FeCl_3$ is commonly used, other salt such as $Fe(NO_3)_3$, $Fe(ClO_4)_3$, $Fe_2(SO_4)_3$, $K_3Fe(CN)_6$, $FeBr_3$, $CuCl_3$ and $CuBr_2$ can be used. In one embodiment of the method, said oxidant is ferric chloride. Preferably, said ferric chloride is dissolved in water and is added dropwise to the reaction mixture. In the case of ferric chloride, it is believed that cationic ferric ions has better affinity to attach on the surface of negatively charged CNCs and induce the polymerization to occur in situ.

In one embodiment of the method, said monomer, such as a pyrrole monomer, and said cellulose nanocrystals are mixed in neutral solution. Preferably, said pyrrole monomer is dissolved in water and is added dropwise to the reaction mixture.

In one embodiment of the method, said step of polymerization of said monomer is carried for a controlled time and temperature, preferably for about 16 hours, preferably at a temperature of from about 0 degrees.

In one embodiment of the method, said step of said conductive polymer/cellulose nanocrystal comprised of quenching the said polymerization. For example the reaction mixture can be treated to remove excess oligomers and unreacted chemicals, for example by ultrafiltration. In a typical ultrafiltration approach, the filtration is applied several times until the filtrate became colorless and transparent.

In one embodiment, the isolated PPy/PVP/CNC can be further processed including drying steps (e.g. freeze-dried) and the dried fine powder pressed or the slurry can be casted (e.g. on an electrode).

In specific embodiments described herein, the surface-modified CNC coated with PVP and PPy are referred to as PPy/PVP/CNC. In practice, surface modification on CNC to provide the core/shell composite, was demonstrated with PVP and PPy, and was achieved through the physical adsorption of the surface agent (such as PVP) which is believed to modify the hydrophilic nature of CNC for the favorable growth of the ICP (such as PPy). It is also believed that PVP acts as a steric stabilizer to prevent PPy-coated hybrid particles from further agglomeration.

As used herein, polypyrrole (PPy) modified CNCs as described in PCT/CA2014/050570 are referred to as PPy/TempoCNC.

As described herein, the present disclosure provides a controlled synthesis of individually coated cellulose nanocrystals (CNCs) as the core and an intrinsic conductive polymer (ICP) as the shell with improved coating morphology and enhanced electrochemical properties. The examples herein demonstrate the synthetic steps required to prepare embodiments of the disclosure.

The conductive nanocomposites described herein or prepared in accordance with the method described herein may find uses in a wide range of applications including conductive ink, printing electronics, and supercapacitor material, etc.

Fabrication of PPy/PVP/CNC

The modified CNCs were first prepared by mixing 0.2 wt % CNC solution with poly(N-vinylpyrrolidone) (PVP) (MW 10,000 Da) at different PVP/CNC mass ratio of 100/100, 40/100, 10/100, 5/100, and 0/100 (samples denoted as PVP100/CNC, PVP 40/CNC, PVP10/CNC, PVP5/CNC and PVP0/CNC respectively).

The mixture was mixed for 24 hours to ensure sufficient adsorption of PVP on CNC surface, which refer herein as PVP/CNC. In one typical polymerization for PPy/PVP/CNC, 15 ml of PVP/CNC solution was transferred to a double-jacketed reaction vessel kept in an ice water bath at 0° C. Then 364.5 mg of Ferric(III) chloride ($FeCl_3$) dissolved in 5 ml water was added dropwise to the suspension and vigorously stirred. After an hour, 106.5 µl of pyrrole monomer (Py) dissolved in 5 ml water was added slowly and the polymerization was left to mix under mild stirring for 16 hours, and the reaction was quenched by repeated washing with deionized (DI) water in an ultrafiltration cell. Finally, the precipitates were freeze-dried, and the dried fine powder and was pressed into pellet under 15000 pounds for conductivity measurements.

Assessment of Surface Modification with PVP and PPy by TEM

The degree of CNC surface modification with PVP and its effect on PPy growth were characterized with a TEM and shown in FIG. 2 in which (a) is pristine CNC; (h) is PVP/CNC (PVP to CNC mass ratio 40%); (c) is PPy/PVP100/CNC; (d) is PPy/PVP40/CNC; (e) is PPy/PVP10/CNC; (t) is PPy/PVP5/CNC; and (g) is PPy/PVP0/CNC. A noticeable size expansion was observed (see FIG. 2(a)-(g)) for the PPy/CNCs synthesized at different PVP/CNC ratio confirming the successful polymerization of PPy shell. The fibril shape of CNCs with 150-250 nm in length was preserved after PPy coating. The most attractive feature of the PPy coating using this protocol is the continuous and uniform PPy coating.

Figure 2A:
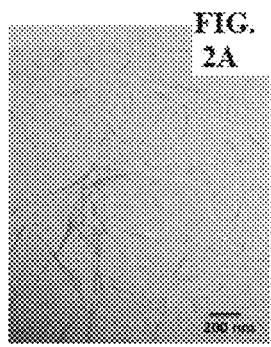
FIG. 2(a)-(h) are TEM images of polypyrrole polymerized on poly(N-vinylpyrrolidone) coated CNC (PPy/PVP/CNC) nanorods in accordance with the disclosure.
Figure 2B:
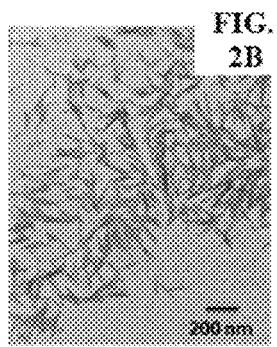
Figure 2C:
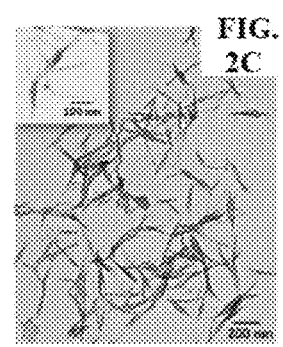
Figure 2D:
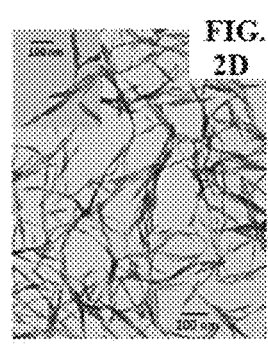
Figure 2E:
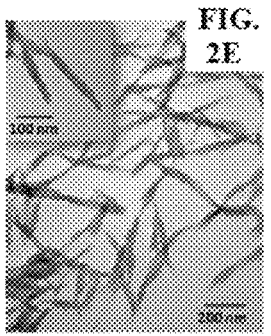
Figure 2F:
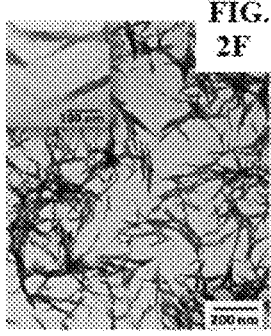
Figure 2G:
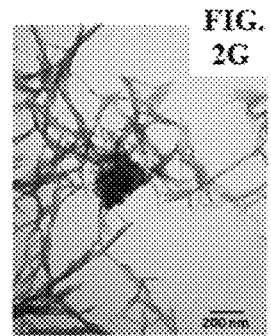
Figure 2H:
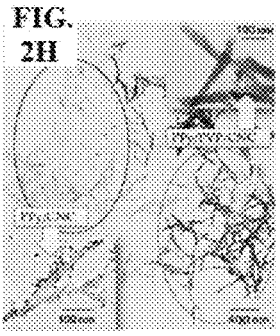

An appreciable increase in the polymerization kinetics from PVP100/CNC to PVP0/CNC was observed based on the accelerating color change from light yellow to black, which was confirmed using a TEM. In FIG. 2(c), CNCs were not completely covered by PPy and the magnified image clearly showed some exposed CNC surface that was not coated with PPy. By decreasing the PVP/CNC mass ratio to 10, a more uniform PPy coating with a thicker shell was formed on the CNC. When the PVP/CNC ratio was decreased, the PPy coating became inhomogeneous. When no PVP was added, the PPy coatings were irregular and rougher caused by the fast polymerization rate (FIG. 2(g)).

Thermal Gravimetric Analyses (TGA)

Thermal gravimetric analyses (TGA) were conducted to qualitatively estimate the mass loading of PPy coating with different degree of CNC modification with PVP. CNC, PPy, PPy/PVP100/CNC, PPy/PVP10/CNC and PPy/PVP0/CNC were placed in an inert ceramic crucible and heated from 25 to 800° C. at a heating rate of 10° C./min in 20 mL/min in air atmosphere.

Figure 3:
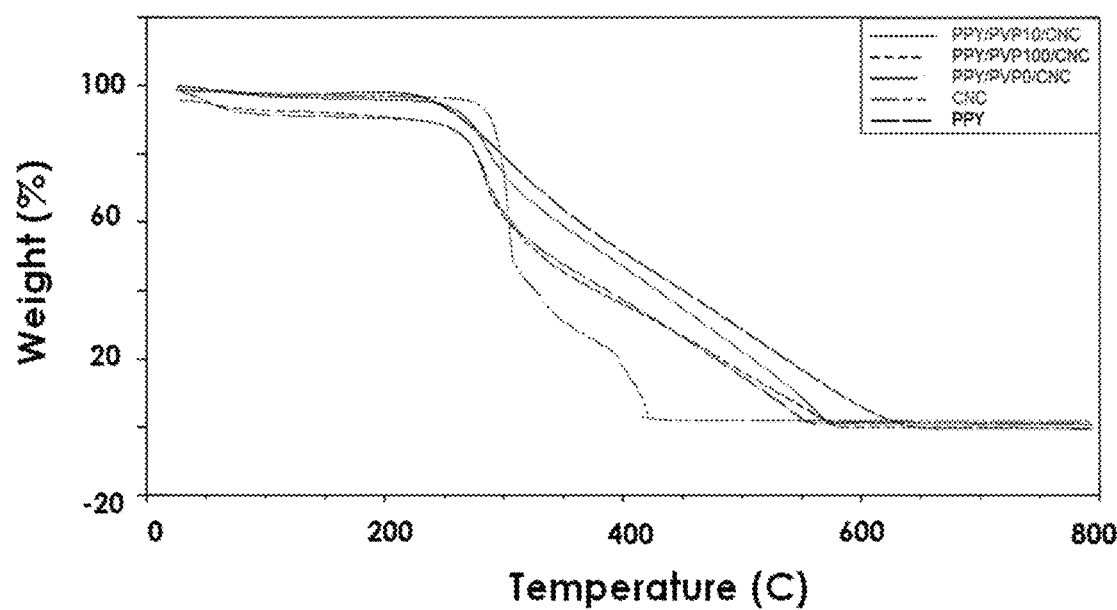
FIG. 3 is TGA curves for certain PPy/PVP/CNC nanorods in accordance with the disclosure.

Due to the higher thermal stability of PPy shell, the higher PPy loading should demonstrate milder decomposition closer to the bulk PPy sample synthesized under the same condition only in the absence of CNC nanoparticles or PVP. Compared with PVP/CNC ratio 100 and 10, the higher PVP addition resulting in the lower PPy loading (35% mass retention for PPy/PVP100/CNC versus 48% PPy/PVP10/CNC at 400 degrees). When no PVP is added to modify CNC, the PPy loading is comparably low as PPy/PVP100/CNC sample demonstrating incomplete PPy coating or a low PPy polymerization efficiency. TGA studies for PPy/PVP100/CNC and PPy/PVP10/CNC suggested a higher thermal stability for the latter. (FIG. 3).

Polymerization of PPy on a Mixture of PVP-Modified and Unmodified CNC

When pyrrole polymerization was performed in a mixture of both modified and unmodified CNCs, two diverse end-products were obtained, demonstrating the role of PVP coating on CNC in controlling the growth of PPy. To highlight the role of PVP in the synthesis process, equal mass of pristine CNC with PVP modified CNC were mixed, and allowed to polymerize in the same reaction vessel. The TEM image (FIG. 2(h)) revealed two different phenomena: polypyrrole was exclusively grown on PVP coated CNC, while those without PVP displayed inhomogeneously coated and globular PPy particles deposited on CNC surface.

The PVP is believed to serve two functions: (i) firstly, being an amphiphilic polymer, PVP provides hydrophobic domain that promotes a favorable growth of PPy on CNC surface; (ii) secondly, being a macromolecule, it acts as steric stabilizers that minimizes the agglomeration of PPy/CNC particles producing stable PPy/PVP/CNC hybrid nanoparticles in aqueous solution. In addition, hydrogen bonding between the carbonyl groups of PVP and the N—H group of Py promotes a uniform growth of PPy on PVP-coated CNC.

UV-Vis Spectra of PPy/PVP/CNC Samples

Figure 4:
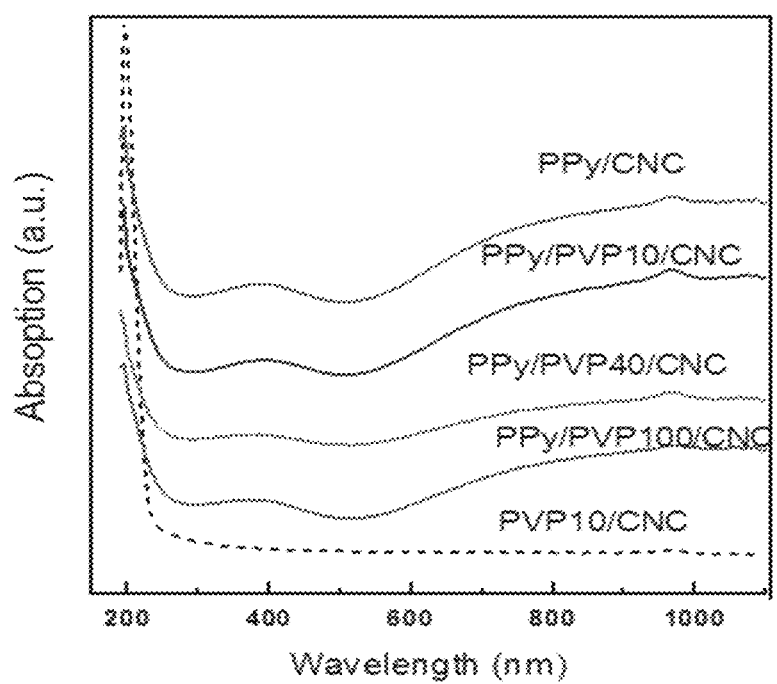
FIG. 4 is a UV-Vis spectra of PVP adsorbed CNC, PPy coated CNC and certain PPy/PVP/CNC nanorods in accordance with the disclosure.

The UV-Vis spectra of PVP adsorbed CNC shows the characterization peak of PVP at 220 nm indicating the successful attachment of PVP to CNC sample prior to the synthesis. The PPy coated samples at different CNC modification extent all show a peak at 420 and a broader peak around 900 nm, attributing to the characterization peaks of polypyrrole. Due to the coating of PPy, the buried PVP peak has shifted to a lower wavenumber from the incomplete peak shown for sample PPy/PVP100/CNC. (see FIG. 4).

FT-IR Spectra of PPy/PVP/CNC Samples

Figure 5:
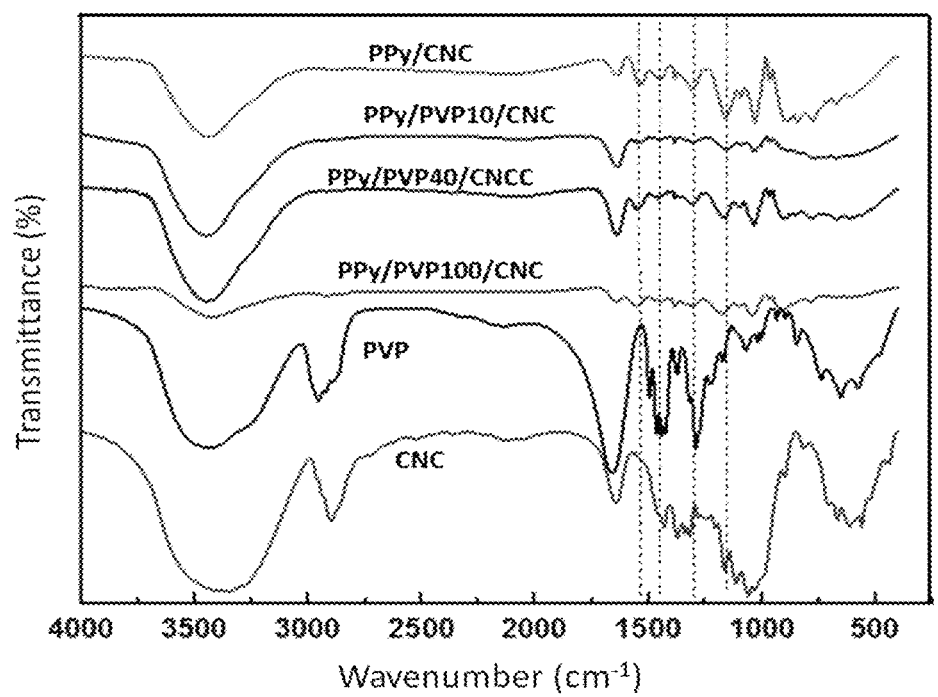
FIG. 5 is a FT-IR spectra for CNC, PVP, PPy coated CNC and certain PPy/PVP/CNC nanorods in accordance with the disclosure.

The PPy coating on CNC was also verified by FT-IR spectroscopy. The characterization peaks indicating the presence of PPy, PVP, and CNC are summarized in Table 1 below. The most important phenomenon is that several strong peaks in PVP or CNC is significantly suppressed after the PPy coating: e.g. C—H stretching peak for PVP at 2956 cm-1 and C—O stretching of CNC at 2900 cm-1, which indicates that the two materials are well embedded in the PPy shell. (see FIG. 5).

TABLE 1

| PVP-related | 1660 cm$^{-1}$ | C=O stretching |
|---|---|---|
| | 2956 cm$^{-1}$ | C—H(CH$_2$) stretching |
| | 3400 cm$^{-1}$ | O—H stretching vibrations of adsorbed water at the surface of particles |

TABLE 1-continued

| | | |
|---|---|---|
| PPy-related | 1547 cm$^{-1}$ | C=C stretching of pyrrole ring |
| | 1455 cm$^{-1}$ | C—N stretching |
| | 1152, 1302 cm$^{-1}$ | =C—H in plane vibration |
| CNC-related | 2900 cm$^{-1}$ | C—O stretching |
| | 3390 cm$^{-1}$ | O—H stretching |

Effect of the Degree of CNC Surface Modification on the Zeta-Potential

Figure 6:
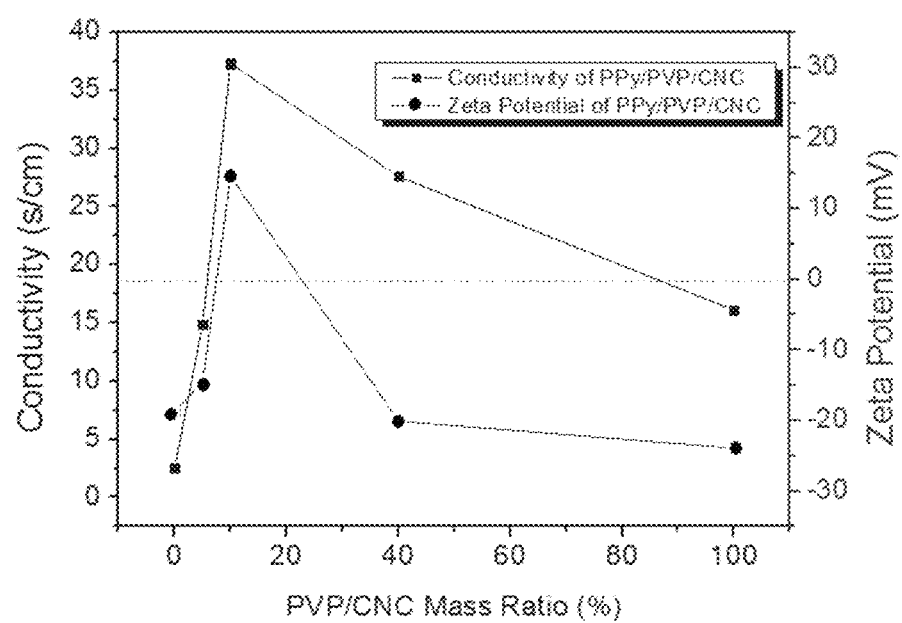
FIG. 6 is a graph illustrating the effect of CNC surface modification on the zeta-potential and conductivity of the hybrid material of PPy/PVP/CNC nanorods in accordance with the disclosure.

The conductivity of PPy/PVP/CNC samples prepared at different PVP/CNC ratio were evaluated and summarized together with the zeta potential (ZP) in FIG. 6 (top curve: conductivity; lower curve: zeta potential). Due to the negatively charged sulfuric acid groups on the surface (i.e. OSO$_3^-$), CNC possessed a negative ZP of −55 mV and is extremely stable in aqueous solution. Coating of PPy neutralized the surface negative charges on CNC by the positively charged PPy backbone. From PPy/CNC10/CNC, the ZP increased sharply to a positive value signifying a homogeneous coating of PPy on CNC (i.e. CNCs are fully covered with PPy layers, thereby shielding the sulfuric acid groups). This correlates with the conductivity data, where PPy/PVP10/CNC possessed the highest conductivity and the most positive ZP. However, when PVP addition was insufficient (less than PVP 5%), the ZP decreased to a negative value, indicating a non-uniform PPy coating on the CNC. The conclusions based on ZP measurements agreed with the TEM observations for all the samples prepared at different PVP/CNC as shown in FIG. 2(c)-(g).

Figure 7:
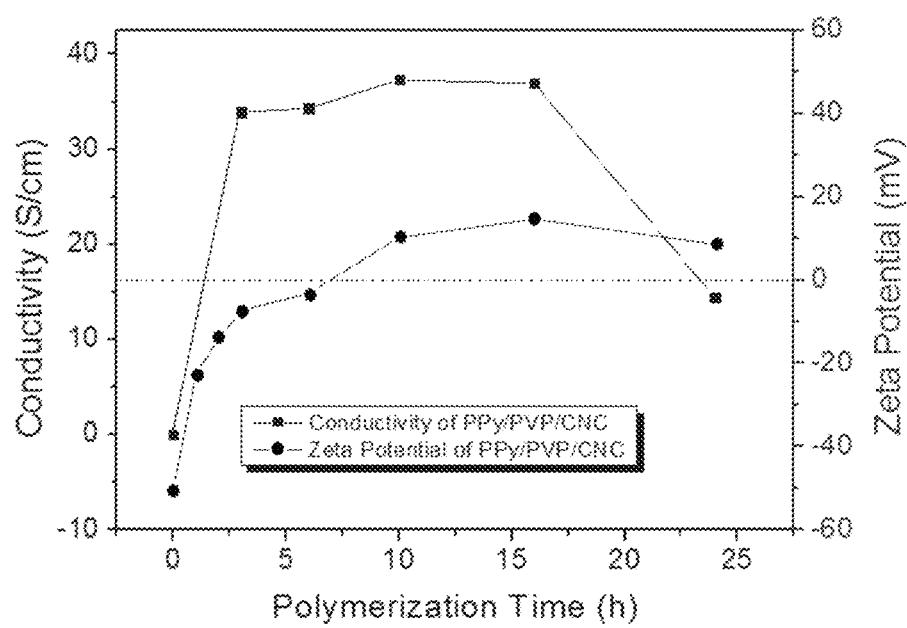
FIG. 7 illustrates the effect of polymerization time on the conductivity and zeta-potential of a PPy/PVP/CNC nanorod in accordance with the disclosure.

Kinetic Study: The Effect of Polymerization Time on the Conductivity and Zeta-Potential The reaction kinetics of the PPy/PVP10/CNC sample were examined by monitoring the changes in ZP over a period of 24 hours, and FIG. 7 summarizes the conductivity and zeta potential as a function of time. The ZP results suggested that the polymerization occurred rapidly in the first 3 hours, and it plateau after 10 hrs. The PPy growth on the surface of CNC approached the conducting percolation threshold at 3 hours with the conductivity reaching a plateau and remained constant for the next 10 hrs and it decreased rapidly after 16 hours. This is not unexpected since extended polymerization often leads to overoxidation that disrupts the ordered conjugation structure in conductive polymer systems. From observation of the TEM image of the PPy/PVP10/CNC sample at 24 hours polymerization, the surface morphology of PPy layer was much rougher and fluffier than the sample at 16 hours.

Cyclic Voltammetry and Study of Capacitance

Figure 8:
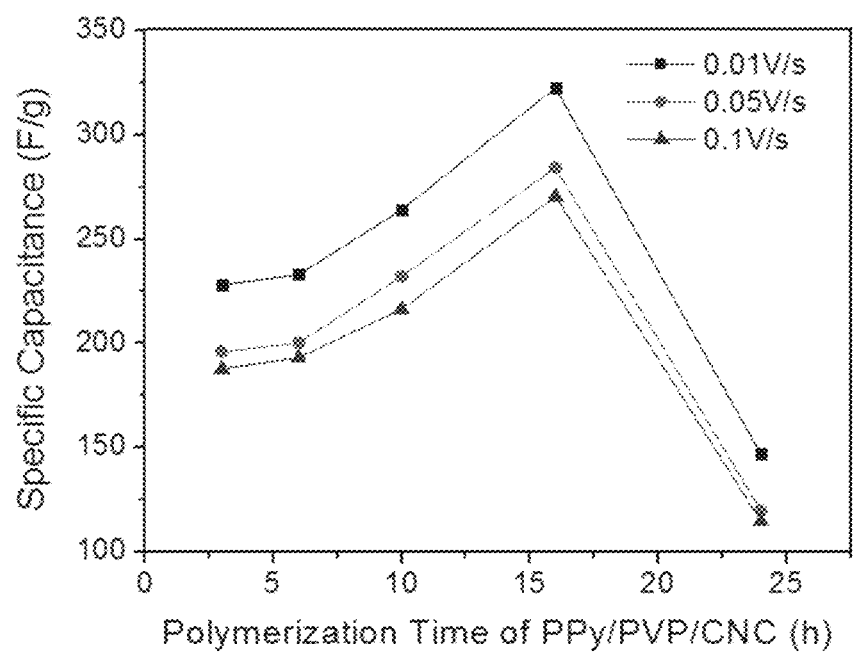
FIG. 8 represents the specific capacitance from cyclic voltammetry test for a PPy/PVP/CNC nanorod in accordance with the disclosure polymerized at different time intervals.

Cyclic Voltammetry (CV) was conducted on different PPy/PVP/CNC systems using a three-electrode half-cell system with a platinum counter electrode and a saturated calomel reference electrode (SCE). The working electrode was fabricated by repeated casting (twice) 10 μL of PPy/CNC (1 mg mL-1 in 50% water/ethanol) dispersion onto graphite carbon (GC) electrode (3 mm in diameter). CV tests were performed between −0.6 and 0.4 V versus SCE in KCl electrolyte (0.5 M). The Cs result from CV tests of different PPy/PVP/CNC samples were plotted and compared in FIG. 8 . The specific capacitance continued to increase from 3 hours until it approached a peak value of between 260 to 320 F/g at 16 hours, and decreased sharply after that. Though the conductivity approached a threshold at 3 hours, the capacitance did not. The capacitance reached its optimal levels when CNC/PVP was evenly coated with PPy. The sharp decrease in the capacitance was attributed to the thick and rough PPy coating, which hindered the ion diffusion and charge transfer. The best performance of PPy/PVP10/CNC in the CV test possessed a capacitance of 323 F/g, which is better than systems prepared with graphene or CNT.

The superior Cs is likely due to the nanoporous network formed by the 1D rod-shaped PPy/PVP/CNCs that possessed significant active surface area for the efficient ion diffusion and transport. Moreover, the lightweight substrate material of CNC and ultrathin and uniform layer of PPy coating also contribute to the high Cs. Within the supercapacitor field, carbon nanotube (single walled/multiwalled) and graphene have aroused tremendous interest in the past due to their super-conductive nature. Table 2 lists the capacitance of carbon nanotube and graphene based electrode materials from different studies as a comparison to this disclosure.

TABLE 2

Capacitance measured in different studies on Single-walled carbon nanotube (SWCT), Multi-walled carbon nanotube (MWCT), PPy-coated MWCT, graphene sheet, nanocomposite of PPy and graphene.

| Material | Electrolyte | Scan Rate | Specific Capacitance | Ref |
|---|---|---|---|---|
| SWCT | 7.5M KOH | 0.1 V/s | 180 F/g | An et al. 2001 |
| MWCT | 6M KOH | 0.01 V/s | 135 F/g | Frackowiak et al. 2000 |
| PPy/MWCT | 1M H$_2$SO$_4$ | 0.01 V/s | 170 F/g | Frackowiak et al. 2001 |
| Graphene | 1MNa$_2$SO$_4$ | 0.01 V/s | 135 F/g | Y Li et al. 2011 |
| PPY/Graphene | 1M KCl | 0.01 V/s | 223 F/g | Y Han et al. 2010 |
| PPy/TEMPO-CNC | 0.5M KCl | 0.01 V/s | 239 F/g | PCT/CA2014/050570 |
| | | 0.05 V/s | 225 F/g | |
| | | 0.1 V/s | 220 F/g | |
| PPy/PVP10/CNC | 0.5MKCl | 0.01 V/s | 323 F/g | This disclosure |
| | | 0.05 V/s | 284 F/g | |
| | | 0.1 V/s | 270 F/g | |

(An et al. 2001): An, K. H.; Kim, W. S.; Park, Y. S.; Moon, J. M.; Bae, D. J.; Lim, S. C.; Lee, Y. S.; Lee, Y. H., *Advanced Functional Materials* 2001, 11 (5), 387-392;

(Frackowiak et al. 2000): Frackowiak, E.; Metenier, K.; Bertagna, V.; Beguin, F., *Applied Physics Letters* 2000, 77 (15), 2421-2423;

(Frackowiak et al. 2001):) Frackowiak E., J. K., Delpeuk S., Beguin F., *J. Power Sources* 2001, 822, 97-98.

(Y Li et al. 2011) Yueming Li, M. v. Z., Shirley Chiang, Ning Pana, *Journal of Power Sources* 2011, 196, 6003-6006.

(Y Han et al. 2010): Yongqin Han, B. D. a. X. Z., *Journal of New Materials for Electrochemical Systems* 2010, 13, 315-320.

Comparison of Capacitance Loss Between PPy/PVP10/CNC and PPy/TempoCNC

The stability during charge and discharge is a critical issue that is closely associated with the properties/morphologies of the active material. Thus, the CV stability tests were performed on PPy/TempoCNC (Py/OH=16) and PPy/PVP10/CNC. Although the Py/OH ratio is defined in PCT/CA2014/050570, a short description follows.

Py/OH refers to the molar ratio of initial pyrrole monomer (Py), to the surface hydroxyl groups (OH) on CNC. The molar amount of surface hydroxyl group on CNC can be calculated on the basis that CNC is made-up of anhydroglucose units (AGU) that possess a molecular weight of 162 g/mol, each AGU contain three hydroxyl groups however about 20% of hydroxyl group are exposed on the surface of CNC. The following formula can be used, (wherein X is the amount in grams of CNC used): 3*(Xg/162(g/mol)*0.2=Z mols of surface hydroxyl groups. For example, when 1 gram of CNC is used the molar amount of hydroxyl group was 3*(1 g/162(g/mol))=0.0185 mol*20%=0.0037 mol.

Figure 9:
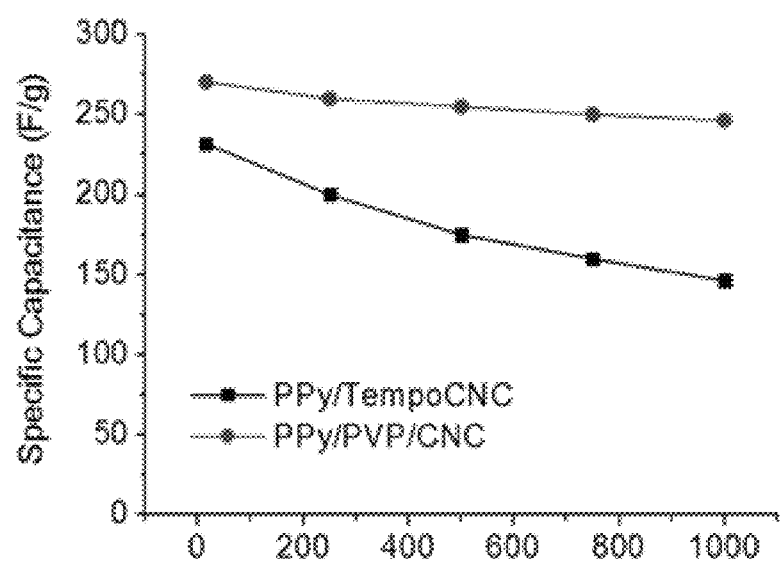
FIG. 9 is illustrating the Capacitance loss between nanorods in accordance with the disclosure and PPy coated CNC prepared by an alternative process.

The capacitance loss over cycling was plotted in FIG. 9. The cycling stability was greatly enhanced in the PPy/PVP/CNC system with less than a 9% capacitance loss compared to a 35% loss for the PPy/Tempo-CNC system. The superior cycling stability is attributed to a more uniform PPy deposition that facilitates the charge transfer and diffusion. In addition, the affinity between PVP and PPy driven by hydrophobic interaction and hydrogen bonding provided a stronger and robust PPy coating. The enhanced cycling stability could also be due to the pseudo-3-layer structure of the PPy/PVP/CNC. The layer in the middle formed by PVP polymer chains serves as a buffer that effectively releases stress induced by ion diffusion/electron transfer within the hybrid material. This is especially advantageous compared to the 2-layered PPy/CNC model where there is no binder at the interface to provide flexibility between the substrate and the PPy sheath.

Comparison of PPy/PVP10/CNC and PPy/Tempo-CNC (PCT/CA2014/050570) Synthesis and Processes.

Table 3 compares one embodiment of this disclosure with TEMPO-oxidized CNCs prepared in accordance with PCT/CA2014/050570. The key advantages of the new approach are: (i) the synthesis is conducted in mild pH condition, instead of very low pH environment needed for TEMPO-CNC; (ii) physical adsorption of PVP onto CNC is simpler than TEMPO-mediated oxidation of CNC for enhanced affinity between the substrate and PPy.

The ZP of PPy/PVP10/CNC was positive while PPy/TempoCNC possessed a negative ZP at −31 mV, suggesting that a more uniform and better coating of PPy was achieved for PVP/CNC system. Secondly, the conductivity of PPy/PVP/CNC increased by 7 times (conductivity increased from 4.9 to 36.9 S/cm), which is largely attributed to the improved PPy coating. PPy/Tempo-CNC produced a globular PPy coating morphology with sporadic coverage on the CNC nanorods, whereas PPy/PVP/CNC displayed a uniform core-sheath structure covering most of the CNC surface. An enhancement of 35% in the specific capacitance was observed for the PPy/PVP/CNC system.

TABLE 3

|  |  | PPy/TempoCNC | PPy/PVP/CNC |
|---|---|---|---|
| Synthesis | pH | Low | Neutral |
|  | Surface modification of CNC | TEMPO-mediated oxidation | PVP adsorption |
| Zeta Potential |  | −31 mV | +16.1 mV |
| Conductivity |  | 4.9 S/cm | 36.9 S/cm |
| Capacitance loss after 1000 cycles |  | 36.9% | 8.9% |

While the disclosure has been described in connection with specific embodiments thereof, it is understood that it is capable of further modifications and that this application is intended to cover any variation, use, or adaptation of the disclosure following, in general, the principles of the disclosure and including such departures from the present disclosure that come within known, or customary practice within the art to which the disclosure pertains and as may be applied to the essential features hereinbefore set forth, and as follows in the scope of the appended claims.

The invention claimed is:

1. A process for preparing a composite having a core-shell arrangement, said composite comprising cellulose nanocrystal (CNC) as the core, a first layer comprising at least one surface agent in contact with said CNC and a second layer comprising at least one intrinsically conductive polymer (ICP) in contact with said surface agent; said process comprising:
    dispersing the cellulose nanocrystal (CNC) in a solution, wherein said CNC has a rod-like shape with a mean diameter of 10-20 nm and length of 200-400 nm;
    mixing the CNC solution and at least one surface agent to cause adsorption of said surface agent on the CNC surface and form said first layer;
    adding at least one monomer of said intrinsically conductive polymer (ICP) and polymerizing said monomer at about neutral pH to form said second layer in contact with said first layer comprising the surface agent, wherein said core is individually coated by said ICP; and
    isolating said composite.

2. The process of claim 1, wherein said surface agent is poly(4-vinylpyridine) (P4VP), poly(N,N-dimethyl acrylamide) (PDMA), Polyethylenimine (PEI), or poly(N-vinylpyrolidone) (PVP).

3. The process of claim 1, wherein said ICP is polypyrrole, polyaniline, polyindole, polythiophene, poly(3-methylthiophene), poly(N-methyl aniline), or poly (o-toluidine).

4. The process of claim 1, wherein a mass ratio of the surface agent/CNC can range from 5/100 to 100/100.

5. The process of claim 1, wherein said surface agent is an amphiphilic agent.

* * * * *